Aug. 2, 1966 D. J. W. TIMMERSMAN 3,263,442
UNDER THE SINK WATER COOLER
Filed July 2, 1964
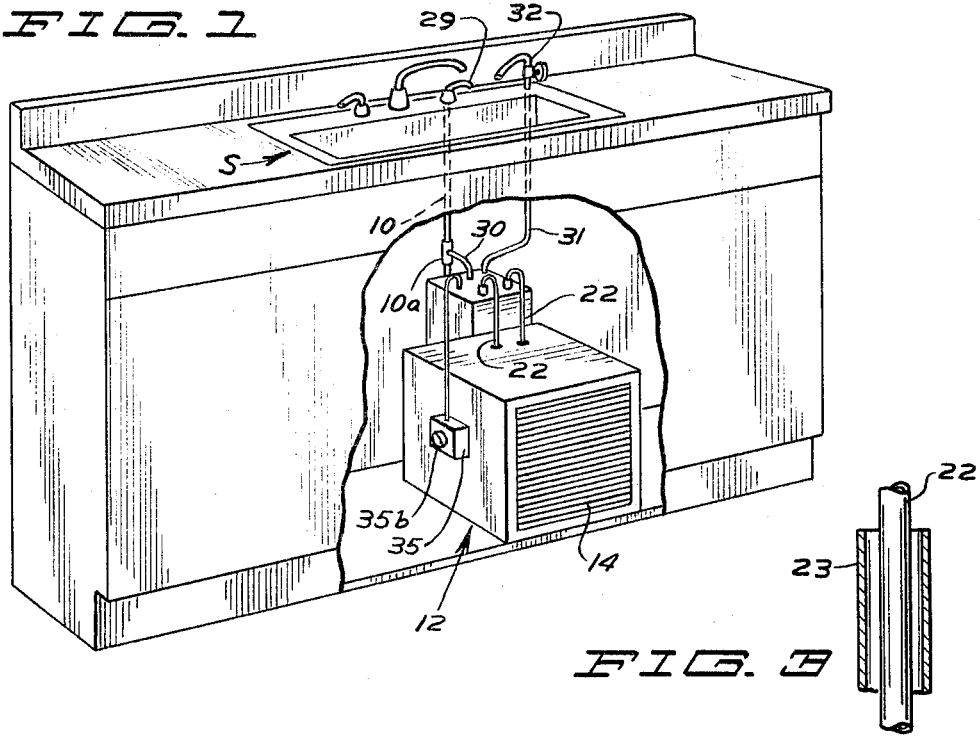
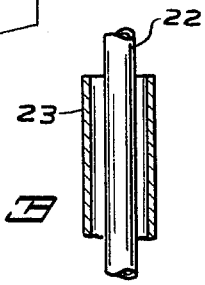
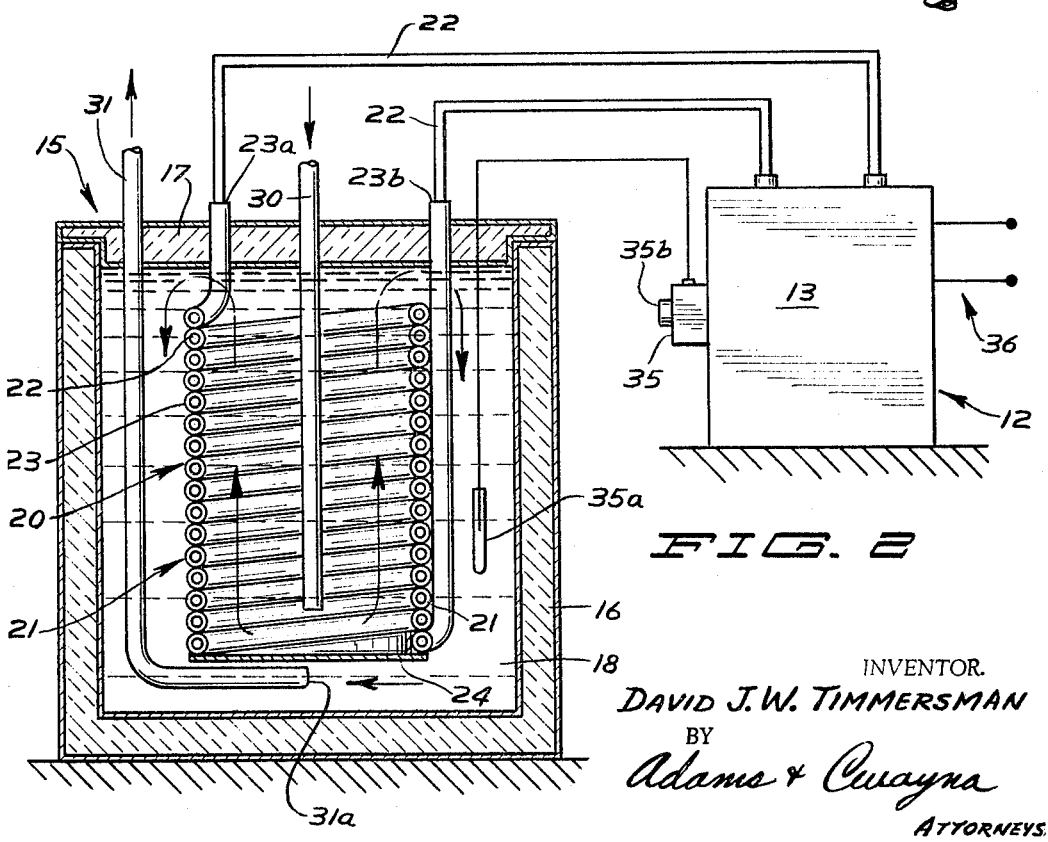
INVENTOR.
DAVID J. W. TIMMERSMAN
BY
Adams & Quayna
ATTORNEYS

United States Patent Office 3,263,442
Patented August 2, 1966

3,263,442
UNDER THE SINK WATER COOLER
David J. W. Timmersman, 3708 Beard N.,
Minneapolis, Minn.
Filed July 2, 1964, Ser. No. 379,903
5 Claims. (Cl. 62—394)

This invention relates generally to refrigeration and cooling apparatus and more particularly to a water cooling unit for use with an available sink.

The general purpose of applicant's invention is to provide a refrigeration unit to provide a continual source of refrigerated cold water to be used with and for use under a sink that is readily available in a home or the like. It is always somewhat of a problem to provide a source of sufficiently cool drinking water and applicant seeks to remedy this situation through the use of an under the sink water cooler.

The cooling unit as provided by applicant consists of a standard refrigeration system which is connected with a water cooling system wherein the refrigerant is directed into a cooling coil in the water cooling system and water from the normal cold water tap may be directed through the cooling system by using an auxiliary faucet.

A portion of applicant's device which cools the water generally comprises a sealed water housing with a cooling coil mounted therein. The housing is sealed and water is directed from the normally available cold water supply line to the housing end as the housing fills pressure is provided for a refrigerated water outlet line which is in turn controlled by an auxiliary cold water tap or faucet.

To insure proper cooling of the water the cooling coil construction is specifically designed to receive the relatively warm incoming water to provide initial chilling of this water and thence to deliver this initially chilled water to the remainder of the housing area where it will remain at a desired cooled temperature until it is needed and withdrawn.

It is therefore an object of applicant's invention to provide an under the sink water cooler having a standard refrigeration unit and having a water cooling unit connected thereto for supplying water at a desired cooled temperature in sufficient amounts as demaned by the user.

It is a further object of applicant's invention to provide a water cooler for connection to and for use with a sink unit wherein a portion of the water normally supplied to the sink unit may be diverted to the cooling structure to maintain this water in sufficient supply at a desired cool temperature.

It is a further object of applicant's invention to provide a cooling water housing having a cooling coil disposed therein which cooling coil is provided with a plurality of helically wound convolutions arranged in generally side by side relation with means thereon for closing the lower end of the convolutions such that when the system is placed under refrigeration water will freeze between adjacent coils thereby connecting the coils to provide a positively sealed open top receptacle and wherein water to be cooled is initially introduced into this open top receptacle to provide initial chilling of the water before it passes from the receptacle to the general housing area where it may be withdrawn for use.

It is still a further object of applicant's invention to provide a cooling coil structure for a cooling water system wherein the coils comprise a doubled wall structure with the internal coil thereof serving as the refrigerant conduit such that water being cooled will not come in contact with the refrigerant conduit but is insulated therefrom to protect the water being cooled against contamination by the refrigerant.

These and other objects and advantages of my invention will more fully appear from the following description made in connection with the accompanying drawing, wherein like reference characters refer to the same or similar parts throughout the several views, and in which:

FIG. 1 is a perspective view illustrating the placement and position of an under the sink water cooler showing the necessary water connections in order to put the unit in operative condition;

FIG. 2 is a schematic illustration of the water cooling unit particularly illustrating the cool water housing with the cooling coil therein;

FIG. 3 illustrates a portion of the coil construction showing the inner refrigeration conduit and the outer insulating coil.

In accordance with the accompanying drawing the water cooler of applicant's invention is arranged to be used in combination with a sink structure having the normal hot water and cold water line 10 and hot water faucet and cold water faucet 11 construction. In the form shown the entire under the sink water cooler unit designated 12 is of a size to be received under a standard sink and thus should enjoy a certain degree of reception by home owners. The cooling system 12 generally includes a standard refrigeration unit 13 and a cooling housing unit 15. This unit 13 is comparable to those refrigeration units generally available and thus no description is thought to be necessary to explain the working portions of the refrigeration unit 13 other than to say the coil unit 14 thereof could be situated anywhere within a kitchen cabinet as ventilation to the unit 13 to eliminate the heat generated in the refrigeration system, has not been found to be a problem.

The most important aspect and portion of this cooling unit 12 is contained in the cooling housing and storage arrangement generally designated 15 which in the form shown consists of an insulated lower housing 16 having a sealable top 17 closely fitted therewith such that water may fill the interior 18 thereof and exert pressure therein, which pressure would be in the range of pressures normally available to home owners. Housing 16 and top 17 are of course insulated to prevent heat rise through the surface of the housing 15.

In the form shown a cooling coil designated generally 20 is arranged in housing 15 and comprises a plurality of helically wound convolutions 21 disposed in adjacent side by side relation being formed of a continuous tube length to permit refrigerant to flow therethrough and absorb heat as it flow therein thus cooling the interior 18 of the housing 15. Coil 20 is a double coil system comprising an inner refrigeration conduit 22 concentrally arranged within an outer insulation tube 23. This relation places the peripheries of the insulating tubes 23 in adjacent side by side relation. Refrigerant conduit 22 is of course connected to the refrigeration unit 13.

The outer insulating conduit 23 does not necessarily extend from the refrigeration unit 13 but in the form shown terminates after passing through the cover 17 of the unit 15. In effect the ends 23a–23b of the insulating conduit 23 are open to the atmosphere which allows water to be cooled without coming into direct contact with the refrigerant containing conduit 22.

In the form shown a plate member 24 is arranged across the coil 20 at one end thereof to close one end thereof. This arrangement will, when ice has formed about coil 23 form a closed bottom—open top receptacle.

Water to be cooled is introduced through a conduit 30 directly into the open top receptacle coil 20 in closely spaced relation to the closed bottom portion 24 thereof. In operation this provides an initial chilling effect to the relatively warm water delivered to the housing 15. In this manner the relatively warm water receives the maximum chilling within this receptacle and after chilling therein will flow upwardly as indicated by the arrows in FIG. 2 into the remaining portion of housing 15 where it may be removed by an outlet conduit 31. Intake 31a of the outlet conduit is provided in close spaced relation to the bottom of the housing 15 such that water at the coolest temperature will be drawn therefrom.

Water inlet 30 is attached to the normally available cold water line 10 through a T or similar fitting. Water outlet conduit 31 in the form shown extends to an auxiliary refrigerated water faucet 32. This arrangement in effect provides a continuous pressure take off line from the supply line 10 through inlet 30, the interior 18 of housing 15 and out the outlet 31 to faucet 32. Opening faucet 32 will allow cooled water to flow and likewise maintain the cooling housing 15 full of water which is received from line 10.

A temperature control unit 35 is attached to and controls the refrigeration unit 13 and has its sensing element 35a located within cooling housing 15 to be responsive to the temperature of the water in said housing. Control 35 may be adjustable through a temperature adjustment unit 35b.

In order to put the unit into operation it is necessary to provide a connection to the cold water supply line 10 and to provide a faucet 32 on the outlet conduit 31. The only other necessary connection is to the power lines 36. In operation the unit will be initially supplied with water to fill tank 18 by opening valve 32. Introduction of the refrigerant into coil 20 will cause water to freeze about conduit 23 and coat the same with ice to form the open top chilling receptacle. The unit is now in condition to supply cold water whenever faucet 32 is opened.

It should be obvious that applicant has provided a unique cooling water apparatus adaptable for use with and which may be positioned under a kitchen or other sink to effectively supply a continuous cold water supply at a predetermined temperature.

It should also be obvious that applicant has provided a unique cooling coil structure which will provide an initial chilling effect to water delivered thereto thus increasing the capacity and efficiency of the unit.

It will, of course, be understood that various changes may be made in the form, details, arrangements and proportion of parts without departing from the scope of my invention, which generally stated consists in the matter set forth in the appended claims.

What I claim is:

1. A combination sink unit and water cooler comprising a cold water faucet connected to a source of running water including:
    (a) a fluid-tight insulated housing arranged for placement under the sink;
    (b) a cooling coil arranged in said housing having a plurality of helically wound convolutions disposed in adjacent side-by-side relation;
    (c) means for supplying refrigerant to said coil;
    (d) means closing the lower end of the helically wound convolutions to provide a cooling chamber defined by said means and said coil;
    (e) means supplying water from the source of running water to said housing, a portion of said water freezing about said coils to close said cooling chamber along the sides thereof to provide a longitudinally extending closed end chamber; and
    (f) a separate discharge ice water faucet receiving chilled water from said housing.

2. The structure set forth in claim 1 wherein the water supplied to said housing is supplied adjacent the closed end of said cooling chamber and internally thereof to produce maximum initial chilling of the water.

3. The structure set forth in claim 1 wherein the means for supplying water to said housing permits water to flow selectively through said cold water faucet and said ice water faucet.

4. The structure set forth in claim 1 wherein said cooling coil comprises a double walled unit consisting of a refrigeration conduit contained within an insulating conduit to insure isolation of the water being cooled from direct contact with the refrigeration conduit.

5. The structure set forth in claim 4 wherein said insulating conduit extends through said housing and is open to the atmosphere.

References Cited by the Examiner

UNITED STATES PATENTS

| 1,733,760 | 10/1929 | Spreen | 62—399 X |
|---|---|---|---|
| 1,859,953 | 5/1932 | Boyer | 62—394 |
| 1,948,780 | 2/1934 | Adams | 62—399 X |
| 2,146,058 | 2/1939 | Doyle | 62—393 X |
| 2,183,509 | 12/1939 | Smith | 62—394 |
| 2,188,574 | 1/1940 | Love | 62—394 |
| 2,418,994 | 4/1947 | Taylor | 62—394 |
| 2,531,323 | 11/1950 | Connell | 62—389 X |
| 2,614,401 | 10/1952 | Roberts | 62—258 |

LLOYD L. KING, *Primary Examiner.*

MEYER PERLIN, *Examiner.*